(12) United States Patent
Oulianov et al.

(10) Patent No.: US 7,962,046 B2
(45) Date of Patent: Jun. 14, 2011

(54) AUTOMATED DISPERSION COMPENSATION OVER A BROAD WAVELENGTH RANGE FOR COHERENT OPTICAL PULSES

(75) Inventors: Dmitri A. Oulianov, Mountain View, CA (US); Stefan Marzenell, Sunnyvale, CA (US); Richard Boggy, Sunnyvale, CA (US)

(73) Assignee: Newport Corporation, Irvine, CA (US)

( * ) Notice: Subject to any disclaimer, the term of this patent is extended or adjusted under 35 U.S.C. 154(b) by 678 days.

(21) Appl. No.: 11/983,583

(22) Filed: Nov. 9, 2007

(65) Prior Publication Data

US 2008/0112709 A1 May 15, 2008

Related U.S. Application Data

(60) Provisional application No. 60/857,871, filed on Nov. 9, 2006.

(51) Int. Cl.
*H04B 10/12* (2006.01)
*G01J 3/00* (2006.01)
*G21H 3/02* (2006.01)
*G21K 5/00* (2006.01)
*H01S 3/16* (2006.01)

(52) U.S. Cl. ............... 398/193; 398/194; 250/458.1; 250/503.1; 372/41

(58) Field of Classification Search .......... 398/193, 398/194, 199; 250/458.1, 503.1; 372/41
See application file for complete search history.

(56) References Cited

U.S. PATENT DOCUMENTS

| 5,991,477 A * | 11/1999 | Ishikawa et al. | 385/24 |
| 6,249,630 B1 * | 6/2001 | Stock et al. | 385/123 |
| 6,282,005 B1 * | 8/2001 | Thompson et al. | 398/143 |
| 2003/0044108 A1 * | 3/2003 | Jacobowitz et al. | 385/24 |
| 2004/0101301 A1 * | 5/2004 | Mitsu et al. | 398/33 |
| 2006/0045147 A1 * | 3/2006 | Sin et al. | 372/20 |

OTHER PUBLICATIONS http://www.femtolasers.com/MOSAIC-TM.123.0.html, product data sheets: Jan 2008.

* cited by examiner

*Primary Examiner* — Nathan M Curs
(74) *Attorney, Agent, or Firm* — Brian F. Swienton

(57) ABSTRACT

The present application is directed to an apparatus and method for the automated compensation of dispersion over a broad wavelength range for coherent optical pulses. In one embodiment, the present application discloses an automatic dispersion compensating optical apparatus configured to change chirp introduced into an optical signal by an optical system in optical communication with the dispersion compensating optical apparatus and includes at least one wavelength-tunable source of coherent optical pulses configured to output at least one optical signal, at least one dispersion compensation device configured to receive the optical signal from the coherent source, and at least one controller in communication with the dispersion compensation device and configured to adjust chirp introduced into the optical signal by the dispersion compensation device as the wavelength of the optical signal is varied.

28 Claims, 1 Drawing Sheet

US 7,962,046 B2

AUTOMATED DISPERSION COMPENSATION OVER A BROAD WAVELENGTH RANGE FOR COHERENT OPTICAL PULSES

CROSS-REFERENCE TO RELATED APPLICATIONS

The present application claims priority to U.S. Provisional Patent Application Ser. No. 60/857,871, filed Nov. 9, 2006, the contents of which is hereby incorporated by reference in its entirety herein.

BACKGROUND

Sources of coherent optical pulses, such as lasers, optical parametric oscillators and amplifiers, etc., configured to produce outputs having very high peak intensities are used in a number of research applications. Such sources are commonly used in applications that include multi-photon microscopy, materials testing, and nonlinear spectroscopy. Many of these applications require high peak intensities and pulsewidths in the sub-picosecond pulse duration regime.

Typically, these sources of coherent optical pulses are used in conjunction with an optical system comprised of one or more optical components, including, without limitation, lenses, mirrors, modulators, acousto-optical modulators, optical crystals, etalons, gratings, optical fibers, and the like. The coherent optical pulses may propagate through a variety of materials, including, without limitation, air, glass, optical coatings applied to one or more optical devices, and the like. The amount of time required for the light to propagate through various optical components often varies as a function of wavelength, this property of optical components is called dispersion. As a result, a chirp may be introduced in the pulsed optical signal propagating through these components, i.e. different wavelength components are shifted in time within the pulse. As such, the pulse duration of the optical pulse becomes longer. Dispersion of an optical component is positive when longer wavelength light travels faster through the optical component than shorter wavelength light. If an optical pulse passes through an optical component with positive dispersion, the pulse becomes positively chirped, i.e. longer wavelength components are ahead of shorter wavelength components within the pulse. In ultra short coherent optical pulse applications (e.g. sub-picosecond and femtosecond) the high peak intensity optical pulse may be substantially degraded during its propagation through the optical system. For example, the peak intensity may be drastically reduced as the pulsewidth increases. Higher order distortion of the pulses is also common.

In response thereto, commonly a dispersion compensator may be positioned within the optical system. Typically, the dispersion compensator is configured to produce a dispersion of an opposite sign to the dispersion of the optical system and, ideally, of the same absolute value. For example, if the optical components within the optical system have positive dispersion and therefore introduce positive chirp into the optical signal, the dispersion compensator is configured to have negative dispersion and introduce negative chirp into the optical signal, thereby negating the positive dispersion of the optical system. Therefore, the pulsewidth in the output of the optical system is short again. While this approach has proven somewhat successful in the past, a number of shortcomings have been identified. For example, dispersion of both the optical system and the dispersion compensator changes significantly with pulse wavelength and not in the same manner. As such, applications requiring wide wavelength ranges require extensive tuning processes to produce compressed pulses over the full wavelength range of the optical system. These tuning processes tend to be time-consuming manual endeavors. Further, these tuning processes may need to be repeated frequently.

In light of the foregoing, there is an ongoing need for a system and method for automatically compensating for the dispersion for coherent optical pulses over a broad range of wavelengths.

SUMMARY

The present application is directed to an apparatus and method for the automated compensation of dispersion over a broad wavelength range for coherent optical pulses. In one embodiment, the present application discloses an automatic dispersion compensating optical apparatus configured to change chirp introduced into an optical signal by an optical system in optical communication with the dispersion compensating optical apparatus and includes at least one wavelength-tunable source of coherent optical pulses configured to output at least one optical signal, at least one dispersion compensation device configured to receive the optical signal from the coherent source, and at least one controller in communication with the dispersion compensation device and configured to adjust chirp introduced into the optical signal by the dispersion compensation device as the wavelength of the optical signal is varied.

In another embodiment, the present application is directed to a method of automatically adjusting chirp of at least one optical signal to the desired value as the signal propagates through an optical system and includes providing a dispersion compensation device having at least one controller in communication therewith, directing at least one optical signal from a tunable coherent source into the dispersion compensation device, sending a control signal from the controller to the dispersion compensation device to automatically adjust the dispersion compensation device to introduce the desired chirp into the optical signal as the wavelength of the signal is tuned, and outputting the optical signal into an optical system in optical communication with the dispersion compensation device.

Other features and advantages of the embodiments of the apparatus and method for the automated compensation of dispersion over a broad wavelength range for coherent optical pulses as disclosed herein will become apparent from a consideration of the following detailed description.

BRIEF DESCRIPTION OF THE DRAWINGS

Various embodiments of apparatus and method for the automated compensation of dispersion over a broad wavelength range for coherent optical pulses will be explained in more detail by way of the accompanying drawings, wherein.

DETAILED DESCRIPTION

Figure 1:
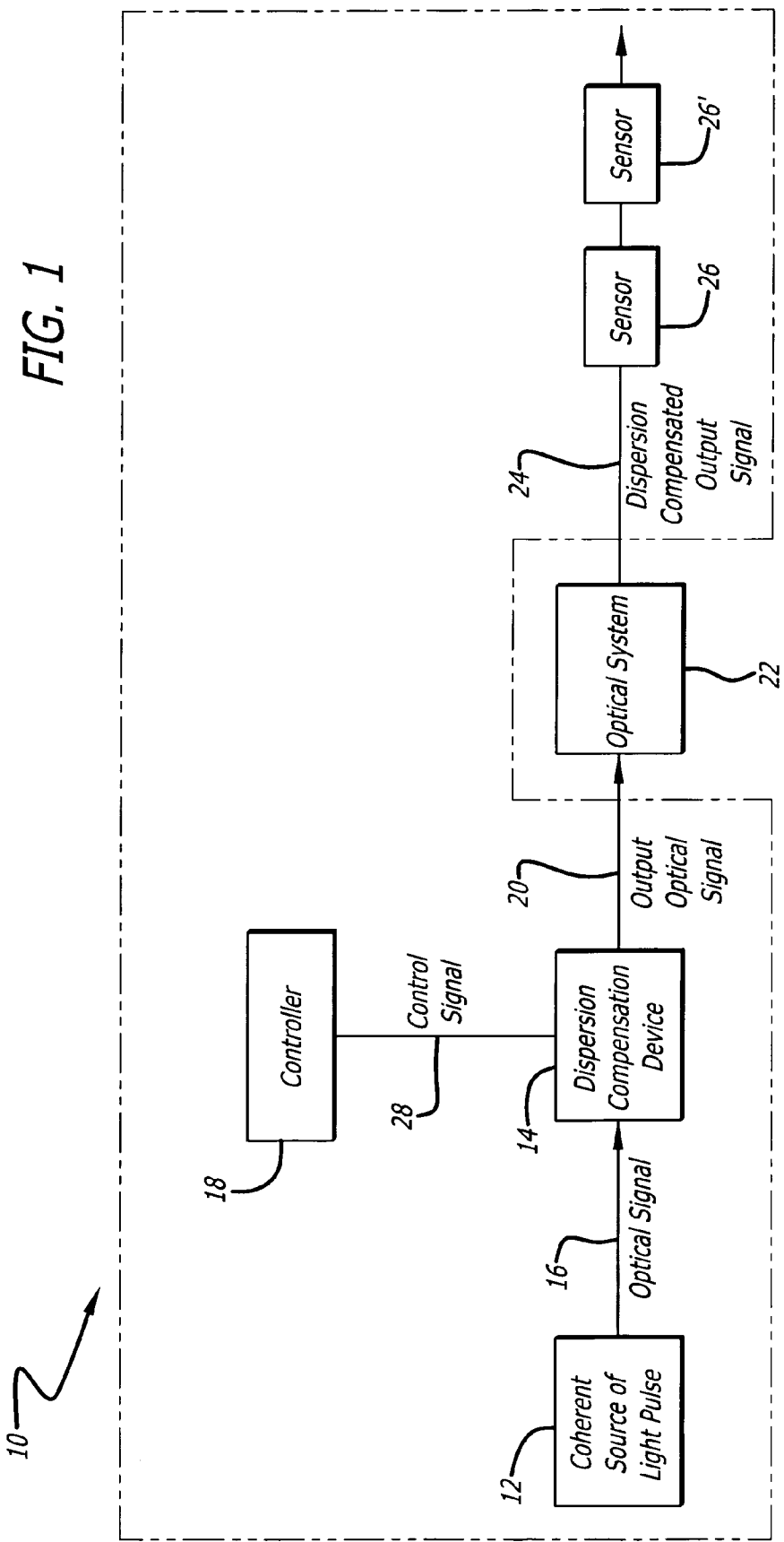
FIG. 1 shows a schematic view of an embodiment of an automated dispersion compensating optical apparatus.

FIG. 1 shows an embodiment of an optical apparatus having a dispersion compensation device therein. As shown in FIG. 1, the dispersion compensating optical apparatus 10 includes at least one wavelength-tunable coherent source of light pulses 12 and at least one dispersion compensation device 14 in optical communication with the coherent source 12. In one embodiment, the coherent source 12 comprises a Ti:Sapphire laser. In an alternate embodiment, the coherent source 12 may comprise one or more Cr:Fosterite lasers, Cr:LiCAF lasers, Cr:LiSAF lasers, Yb:KYW lasers, Yb:KGW lasers, dye lasers, optical parametric oscillators, master oscillator power amplifiers, optical parametric amplifiers, and any other pulsed coherent light sources. As such, in one embodiment the coherent source is tunable over a range of wavelengths from about 300 nm to about 3000 nm. In another embodiment, the coherent source is tunable over a range of wavelengths from about 500 nm to about 1500 nm. In another embodiment, the coherent source may be tunable over a range of wavelengths from about 600 nm to about 1300 nm. In one embodiment the coherent source produces optical pulses of shorter than one picosecond pulse widths.

Referring again to FIG. 1, the coherent optical source 12 emits one or more optical signals or beams 16 consisting of a sequence of optical pulses which are directed into the dispersion compensation device 14. In one embodiment, the dispersion compensation device 14 includes one or more prisms. In another embodiment, the dispersion compensation device 14 may include one or more prisms, gratings, etalons, chirp mirrors, spatial light modulators, lenses, optical mounts, optical stages, optical fibers, bulk materials, motors, actuators, Gires Tournois interferometers, and the like. Furthermore, one or more of the optical components contained within the dispersion compensation device 14 may be adjustably positioned therein. For example, at least one element within the dispersion compensation device may be configured to translate axially or laterally, to rotate, or to tilt, and/or any combination thereof. As such, the dispersion compensation device 14 may include one or more selectively positionable optical mounts, stages, actuators, motors, positioning devices, and the like. In one embodiment, the dispersion compensation device 14 has a throughput of greater than about 70%. In an alternate embodiment, the dispersion compensation device has a throughput of greater than about 80%.

In one embodiment, the dispersion compensation device 14 may be configured to introduce desired negative or positive chirp into the output optical signal 20 shown in FIG. 1. For example, assuming that the optical system 22 inherently introduces a positive chirp into an incident optical signal, the dispersion compensation device 14 may be configured to output a negatively chirped output 20 to the optical system 22. In one embodiment, the magnitude of the negative chirp in the output signal 20 is approximately equal to the positive chirp to be introduced into the optical signal by the optical system 22. As such, the dispersion compensation device 14 may be configured to provide a negative dispersion of approximately the same value as a positive dispersion of the optical system 22 at all operation wavelengths in order to fully compensate for the pulse degradation caused by the dispersive optical system 22. Further, this dispersion compensation device 14 can be adjusted for the second order dispersion (GDD: group delay dispersion) as well as any higher order dispersion and/or alternate types of dispersion, and can be used to adjust the pulse duration or peak intensity of the optical pulses. In another embodiment, the magnitude of the negative chirp in the output signal 20 is greater than the positive chirp to be introduced into the optical signal by the optical system 22. In another embodiment, the magnitude of the negative chirp in the output signal 20 is less than the positive chirp to be introduced into the optical signal by the optical system 22.

As shown in FIG. 1, the dispersion compensation device 14 is in communication with at least one controller 18. In one embodiment, the controller 18 may be configured to provide one or more control signals 28 to the dispersion compensation device 14. In addition, the controller 18 may provide one or more control signals to the coherent source 12. Further, the controller 18 may be configured to store data relating to one or more pulse characteristics, wavelength characteristics, coherent source performance, or properties of the optical system 22. In another embodiment, the controller 18 may be configured to store one or more data tables, algorithms, formulas, and the like therein. For example, the controller 18 may be configured to store data relating the dispersion of one or more optical devices used within the optical system 22. Optionally, this data may be provided to the controller 18 by a user, determined from preset configurations of the dispersion compensation device 14, or provided by one or more sensors 26, 26' in communication with the coherent source 12. For example, the controller 18 may be configured to calculate the dispersion characteristics of an optical system 14 based on known dispersion characteristics of the individual optical components therein which may be stored in the controller 18, or provided thereto by an external source. As such, the controller 18 may be in communication with an external information source such as a user-accessible computer. For example, the present system may be configured to have a pre-generated wavelength-based dispersion table manually input by a user into the controller 18 thereby permitting the dispersion compensation device 14 to be adjusted in response to the inputted table. Optionally, the user may input the dispersion characteristics of the optical system 22 at a given wavelength into the controller 18. Thereafter, the controller 18 may be configured to calculate the dispersion characteristics of the optical system 22 at various wavelengths and adjust the dispersion compensation device 14 to output an appropriately chirped signal 20 accordingly.

Referring again to FIG. 1, at least one optical system 22 may be in communication with the dispersion compensating optical apparatus 10. The optical system 22 may include one or more lenses, mirrors, beam splitters, spatial filters, attenuators, beam profilers, gratings, etalons, acousto-optical devices, modulators, optical crystals and fibers, bulk materials, telescopes, microscopes, non-linear devices, and the like. Typically, the various components forming the optical system 22 have dispersion and introduce chirp into an optical signal propagating through the optical apparatus 10. In one embodiment, the optical system 22 introduces positive chirp into an optical signal propagating through it. In an alternate embodiment, the optical system 22 introduces negative chirp to an optical signal propagating through it. In one embodiment, the chirp introduced into an optical signal by the optical system 22 may be known and provided to the controller 18 by the user. As such, the dispersion compensation device 14 may be adjusted by the controller 18 to pre-compensate the chirp introduced into the signal by the optical system 22. In another embodiment, the controller 18 may be configured to access data stored on the controller 18 relating to the dispersion characteristics of various elements or devices used within the optical system 22, to calculate the dispersion of the entire optical system 22 therefrom, and to adjust the dispersion compensating device 14 accordingly.

In one embodiment the dispersion compensating optical apparatus 10 optionally may include one or more sensors 26 therein. For example, in one embodiment, the dispersion compensating optical apparatus 10 may include a first sensor 26 and at least a second sensor 26'. The first sensor 26, the second sensor 26', or both may be configured to measure any variety of optical characteristics, including, without limitation, wavelength, pulse energy, repetition rate, pulse width, peak intensity fluorescence intensity, multi-photon fluorescence intensity, SHG intensity, 2-photon absorption, and multi-photon absorption and the like. In one embodiment, the first sensor 26 and the second sensor 26' are configured to measure different optical characteristics of the dispersion compensated output signal 24. For example, the first sensor 26 may be configured to measure pulse width, pulse chirp, and/or peak intensity of the dispersion compensated output signal 24 while the second sensor 26' is configured to measure the wavelength thereof. In an alternate embodiment, the first and second sensors 26, 26' are configured to measure the same optical characteristics. Further, additional sensors may be positioned within the dispersion compensating optical apparatus 10 and the optical system 22. Similarly, the first and second sensors 26, 26' may be positioned anywhere within the dispersion compensating optical apparatus 10 and the optical system 22.

Referring again to FIG. 1, optionally the controller 18 may be in communication with at least one component within the dispersion compensating optical apparatus 10 and the optical system 22. For example, as shown in FIG. 1, the controller 18 may also be coupled to or otherwise in communication with at least one of the coherent source 12, the optical system 22, the first sensor 26, and/or the second sensor 26'. For example, the controller 18 may be coupled to the coherent source 12 and configured to adjust and monitor one of output wavelength, pulse repetition rate, pulse width, peak intensity, and the like. In one embodiment the controller 18 is in communication with the dispersion compensation device 14 and the first sensor 26. As a result, assuming the first sensor 26 is configured to sense one or more pulse characteristics of an optical signal, the dispersion compensating optical apparatus 10 enables the user to automatically adjust or optimize one or more pulse characteristics of the compensated output signal 22 while the wavelength is tuned, in contrast to prior art systems which relied on tedious manual optimization techniques.

In another embodiment, the first sensor 26 is used to characterize the beam in means of pulse width, pulse chirp, or peak intensity. For at least one wavelength, the user adjusts the controller 18 to change the configuration of the dispersion compensation device 14 to optimize the signal at the sensor 26. This value is stored as one configuration in a table within the controller 18. This procedure may be repeated for other wavelengths. After calibration the dispersion compensating apparatus 10 at one or more wavelengths the sensor 26 may be removed from the apparatus 10. All table entries may be used to calculate the configuration of the dispersion compensation device 14 for all other accessible wavelengths. The wavelength information may be received by the controller 18 from the coherent source 12, the second sensor 26', or from an external source.

FIG. 1 shows one embodiment of an automatic dispersion compensating optical apparatus 10. Those skilled in the art will appreciate that various elements thereof may be positioned at various locations throughout the system. For example, the dispersion compensation device 14 may be positioned within the coherent source 12. In another embodiment, the dispersion compensation device 14 may be positioned within the optical system 22. As such, embodiments disclosed herein are illustrative of the principles of the invention. Other modifications may be employed which are within the scope of the invention. Accordingly, the devices disclosed in the present application are not limited to that precisely as shown and described herein.

We claim:

1. An automatic dispersion compensating optical apparatus configured to change chirp introduced into an optical signal by an optical system in optical communication with the dispersion compensating optical apparatus, comprising:

at least one wavelength-tunable mode-locked solid state source of coherent optical pulses configured to output at least one optical signal;

at least one dispersion compensation device configured to receive the optical signal from the coherent source; and at least one controller in communication with the dispersion compensation device and configured to adjust chirp introduced into the optical signal by the dispersion compensation device as the wavelength of the optical signal is varied.

2. The apparatus of claim 1 wherein the wavelength of the optical signal is tunable of a range of wavelengths from about 300 nm to about 3000 nm.

3. The apparatus of claim 1 wherein the wavelength of the optical signal is tunable of a range of wavelengths from about 500 nm to about 1500 nm.

4. The apparatus of claim 1 wherein the wavelength of the optical signal is tunable of a range of wavelengths from about 600 nm to about 1300 nm.

5. The apparatus of claim 1 wherein the dispersion compensation device includes at least one optical element adjustably positioned therein.

6. The apparatus of claim 5 wherein the optical element is selected from the group consisting of prisms, gratings, etalons, chirp mirrors, spatial light modulators, lenses, optical mounts, optical stages, optical fibers, bulk materials, motors, actuators, and Gires Tournois interferometers.

7. The apparatus of claim 5 wherein the controller is in communication with the optical element.

8. The apparatus of claim 1 wherein the dispersion compensation device has a throughput of greater than about 70%.

9. The apparatus of claim 1 wherein the dispersion compensation device has a throughput of greater than about 80%.

10. The apparatus of claim 1, wherein the tunable coherent source of light pulses generates light pulses having a pulsewidth of less than about one picosecond.

11. The apparatus of claim 1 wherein the controller is in communication with the coherent source and configured to adjust and monitor at least one of the wavelength, pulse energy, pulse peak intensity, pulse repetition rate, and pulse width of the optical signal.

12. The apparatus of claim 1 wherein the controller includes at least one storage device therein.

13. The apparatus of claim 12 wherein the storage device is configured to store at least one table containing dispersion characteristics of at least one optical system in communication with the coherent source.

14. The apparatus of claim 13 wherein the table is configured to be provided by a user to the storage device.

15. The apparatus of claim 13 wherein the table is preloaded onto the storage device.

16. The apparatus of claim 13 wherein the table is configured to be calculated within the controller from information received from at least one of a user, the coherent source, the optical system in communication with the coherent source, and at least one sensor in communication with the coherent source.

17. The apparatus of claim 1 wherein the optical system is selected from the group consisting of telescopes, microscopes, lenses, mirrors, beam splitters, spatial filters, attenuators, beam profilers, gratings, etalons, acousto-optical devices, modulators, optical crystals and fibers.

18. The apparatus of claim 1 further comprising at least one sensor in communication with at least one of the coherent source, the controller, dispersion compensation device, and the optical system, the sensor configured to measure at least one optical characteristic of the optical signal.

19. The apparatus of claim 18 wherein the sensor is configured to measure at least one optical characteristic of the optical signal, the optical characteristics selected from the group consisting of wavelength, pulse energy, repetition rate, pulse width, peak intensity, fluorescence intensity, multi-photon fluorescence intensity, SHG intensity, 2-photon absorption, and multi-photon absorption.

20. The apparatus of claim 1, wherein the optical dispersion compensation device is configured to adjust at least one dispersion type selected from the group consisting of second order dispersion (GDD: group delay dispersion), third order dispersion, fourth order dispersion, fifth order dispersion, positive dispersion, negative dispersion, and positive and negative dispersion.

21. A method of automatically adjusting chirp of at least one optical signal to the desired value as the signal propagates through an optical system, comprising:
providing a dispersion compensation device having at least one controller in communication therewith;
directing at least one optical signal from a tunable mode-locked solid state coherent source into the dispersion compensation device;
sending a control signal from the controller to the dispersion compensation device to automatically adjust the dispersion compensation device to introduce the desired chirp into the optical signal as the wavelength of the signal is tuned; and
outputting the optical signal into an optical system in optical communication with the dispersion compensation device.

22. The method of 21 further comprising:
storing at least one table of the dispersion characteristics of the optical system at one or more wavelengths within a storage device located within the controller;
accessing the table stored in the storage device of the controller; and
adjusting the dispersion compensation device using the table data to a desired value of chirp introduced into the optical signal as the wavelength is tuned.

23. The method of claim 21 further comprising calculating with the controller the dispersion of the optical system at a variety wavelengths based on the dispersion at one or more other wavelengths.

24. The method of claim 22 further comprising loading a dispersion characteristics table into the storage device of the controller.

25. The method of claim 22 further comprising:
providing at least one sensor in optical communication with the coherent source;
generating at least one dispersion characteristics table within the controller based on the data measured by the sensor; and
adjusting the dispersion compensation device to change chirp introduced into the optical signal by the optical system as the wavelength is tuned based on the generated table.

26. The method of claim 25 further comprising measuring at least one of the wavelength, pulse energy, repetition rate, pulse width, peak intensity or any nonlinear peak-intensity-dependent signal, fluorescence intensity, multi-photon fluorescence intensity, SHG intensity, 2-photon absorption, and multi-photon absorption with the sensor.

27. The method of 21 further comprising
providing at least one sensor in communication with the optical system and the controller;
sending data measured by the sensor to the controller;
adjusting the dispersion compensation device to optimize at least one parameter of an optical signal propagating through the optical system and measured by the sensor.

28. The method of claim 27 further comprising optimizing at least one of the pulse width, pulse energy, peak intensity or any nonlinear peak-intensity-dependent signal, fluorescence intensity, multi-photon fluorescence intensity, SHG intensity, 2-photon absorption, and multi-photon absorption.

\* \* \* \* \*